United States Patent
Collins

(10) Patent No.: US 12,184,353 B2
(45) Date of Patent: Dec. 31, 2024

(54) AUTOMATICALLY SYNCHRONIZING A TRANSMITTER AND RECEIVER IN A MAGNETIC TRACKING SYSTEM USING INFORMATION FROM AN INERTIAL MEASUREMENT UNIT

(71) Applicant: Penumbra, Inc., Alameda, CA (US)

(72) Inventor: Michael D. Collins, Fremont, CA (US)

(73) Assignee: Penumbra, Inc., Alameda, CA (US)

( * ) Notice: Subject to any disclaimer, the term of this patent is extended or adjusted under 35 U.S.C. 154(b) by 352 days.

(21) Appl. No.: 17/728,094

(22) Filed: Apr. 25, 2022

(65) Prior Publication Data
US 2023/0078316 A1 Mar. 16, 2023

Related U.S. Application Data

(60) Provisional application No. 63/277,748, filed on Nov. 10, 2021, provisional application No. 63/245,125, filed on Sep. 16, 2021.

(51) Int. Cl.
*H04B 5/26* (2024.01)
*H01Q 7/00* (2006.01)
*H04B 17/309* (2015.01)

(52) U.S. Cl.
CPC ............... *H04B 5/26* (2024.01); *H01Q 7/00* (2013.01); *H04B 17/309* (2015.01)

(58) Field of Classification Search
None
See application file for complete search history.

(56) References Cited

U.S. PATENT DOCUMENTS

| | | | |
|---|---|---|---|
| 4,737,794 A | 4/1988 | Jones | |
| 2016/0011013 A1 | 1/2016 | Pedrotti et al. | |
| 2019/0158340 A1* | 5/2019 | Zhang | H04B 17/318 |
| 2019/0353745 A1 | 11/2019 | Zur et al. | |
| 2020/0158487 A1* | 5/2020 | Zur | G01R 33/028 |
| 2022/0141684 A1* | 5/2022 | Li | H04W 56/001 |
| | | | 370/337 |

FOREIGN PATENT DOCUMENTS

GB   2488899 A * 9/2012 ........... H04B 1/0064

* cited by examiner

*Primary Examiner* — Raul J Rios Russo
*Assistant Examiner* — Carl F. R. Tchatchouang
(74) *Attorney, Agent, or Firm* — Haley Guiliano LLP

(57) ABSTRACT

Automatic synchronization of a magnetic field transmitter and receiver is performed to resolve phase ambiguity so that phase information, used in determining the position and orientation of the receiver, may be derived and maintained. Inertial measurement unit (IMU) information is used to infer gravity-relative orientations of the transmitter and receiver, which are then used as constraints in the synchronization process to determine the position and orientation of the receiver from all four possible solutions or variations. The variation that best conforms to the IMU orientations is chosen as the sync candidate.

12 Claims, 2 Drawing Sheets

AUTOMATICALLY SYNCHRONIZING A TRANSMITTER AND RECEIVER IN A MAGNETIC TRACKING SYSTEM USING INFORMATION FROM AN INERTIAL MEASUREMENT UNIT

This application claims priority to U.S. Provisional Application No. 63/245,125, filed Sep. 16, 2021, and U.S. Provisional Application No. 63/277,748, filed Nov. 10, 2021, which are hereby incorporated by reference herein in their entireties.

FIELD OF THE INVENTION

The present invention relates generally to magnetic tracking devices, and more particularly to phase synchronization between a transmitter and a receiver for such devices.

BACKGROUND OF THE INVENTION

Alternating current (AC) magnetic tracking systems typically use a method in which magnetic fields are generated and measured using a system of orthogonal coils to generate position and orientation information which is used by a computer system. One common application is tracking a user for the purpose of playing a video game or being immersed in a virtual reality world.

In some prior art systems, a transmitter has three orthogonal coils that generate the magnetic field signal, and may be located in a fixed position, such as in a local base station, video game console or other apparatus. A receiver, also known as a sensor, in a tracking device similarly has three orthogonal magnetic field sensing coils and provides information about the sensed magnetic field to a processor, which derives the position and orientation of the tracking device relative to the base station from such information.

Such AC magnetic trackers, and the processors which determine the position and orientation of such trackers, are well known to those of skill in the art. One such example, U.S. Pat. No. 4,737,794 ("the '794 patent") incorporated by reference herein, teaches a "method and apparatus for determining remote object orientation and position with an electromagnetic coupling." It shows a transmitter comprising a plurality of radiating antennas located at a source to provide a plurality of magnetic fields spanning three dimensional space and defining a source reference coordinate frame, and a receiver comprising a plurality of receiving antennas located on an object to be tracked for receiving that field. A processor receives the outputs from the receiving antennas and converts the received components of the transmitted magnetic fields into remote object position and orientation relative to the source reference coordinate frame. The antennas may be, for example, dipole antennas, loop antennas, or coil antennas.

In such a system having three transmitter antennas, a receiver generates a signal that is a 3×3 signal matrix, called a "SigMat," which represents a total of nine measures of the three transmitted magnetic fields; each column corresponds to the sensed field from a separate one of the three coils of the transmitter, and each row corresponds to a separate one of the three coils of the receiver. One example of a 3×3 matrix that might represent SigMat is:

| a11 | a12 | a13 |
| a21 | a22 | a23 |
| a31 | a32 | a33 | where a11 through a33 represent the nine measures of the three magnetic fields, one measure of each magnetic field by each of the three receiver coils.

It is the evaluation of SigMat that results in a determination of the position of the receiver. However, as noted in the '794 patent, the sign of the position is ambiguous, which means that there is a hemispherical ambiguity that cannot be resolved without further information, since due to the physics of magnetic fields a second receiver displaced 180 degrees about the origin from a first receiver will produce the same SigMat.

In wired tracking systems, a synchronization ("sync") signal between the transmitter and receiver indicates the phases of the magnetic field signals and enables the receiver to extract the relative signs of the signals. (In some cases another means, such as a camera or other optical device, may be used to pass or determine this information.) The signs indicate the orientation and direction of the magnetic field (i.e., positive or negative in direction and its orientation).

In a wireless system, when there is no sync signal between the receiver and transmitter, there remains an ambiguity with respect to the signal's signs and thus also with respect to the position and orientation of the receiver relative to the transmitter. Thus, when the phase of the transmitted signal is unknown, the sign of the received signals is ambiguous, which can create an uncertainty in the location of the receiver with respect to its direction from the transmitter.

In order to resolve this phase ambiguity in a wireless system, a startup synchronization process has been used, according to a known prior approach, in which the phase information is derived by placing the receiver at a known location and orientation (e.g., the receiver is a video game controller which is placed by a user in a docking station configured to hold the controller), and comparing the possible values of SigMat at that location to expected values of SigMat to find the best match.

It some applications, however, there is a requirement that the system be able to determine the correct receiver position and orientation without any user intervention. In other words, it is desirable for the system to be able to resolve such phase ambiguity without requiring the user to perform any specialized task such as placing the receiver in a docking station or other known position.

SUMMARY OF THE INVENTION

A system and method is disclosed which automatically determines the phase relationship between a transmitter and receiver in a magnetic tracking system.

One embodiment discloses a method of automatically synchronizing a transmitter and receiver in a magnetic tracking system to properly determine a position and orientation of the receiver relative to the transmitter, the transmitter comprising a plurality of source magnetic coils each configured to generate a magnetic field and a transmitter inertial measurement unit (IMU), and the receiver comprising a plurality of sensor magnetic coils configured to sense the magnetic fields and to generate a raw signal matrix (SigMat) representing the position and orientation of the receiver relative to the transmitter and a receiver inertial measurement unit (IMU), the method comprising; receiving, at a processor, the raw SigMat from the receiver, receiver IMU acceleration data from the receiver, receiver IMU angular velocity data from the receiver, transmitter IMU acceleration data from the transmitter, and transmitter IMU angular velocity data from the transmitter; generating, by the processor, a global orientation of the receiver from the receiver IMU acceleration data and the receiver IMU angular velocity data; generating, by the processor, a global orientation of the transmitter from the transmitter IMU acceleration data and the transmitter IMU angular velocity data; generating, by the processor, a set of rotated SigMats by multiplying the raw SigMat by each of four sync correction matrices; generating, by the processor, a set of calibrated, rotated SigMats from the rotated SigMats by applying orthogonalization gain matrices for the receiver sensor magnetic coils and the transmitter source magnetic coils to the rotated SigMats; determining, by the processor, a residual error of each of the calibrated, rotated SigMats; and selecting, by the processor, the calibrated, rotated SigMat having a lowest residual error as the correct SigMat to be used for synchronization of the receiver relative to the transmitter.

A further embodiment discloses the method further comprising: determining, by the processor, the calibrated, rotated SigMat having a next lowest residual error; determining, by the processor, that the residual error of the calibrated, rotated SigMat having the lowest residual error is less than a predefined sync threshold; and determining, by the processor, that the residual error of the calibrated, rotated SigMat having the lowest residual error divided by the residual error of the calibrated, rotated SigMat having the next lowest residual error is greater than a predefined sync value ratio.

Another embodiment discloses an automatically synchronizing magnetic tracking system for properly determining a position and orientation of a receiver relative to a transmitter, comprising: a transmitter comprising a plurality of source magnetic coils each configured to generate a magnetic field and a transmitter inertial measurement unit (IMU); receiver comprising a plurality of sensor magnetic coils configured to sense the magnetic fields and to generate a raw signal matrix (SigMat) representing the position and orientation of the receiver relative to the transmitter and a receiver inertial measurement unit (IMU); and a processor configured to: receive the raw SigMat from the receiver, receiver IMU acceleration data from the receiver, receiver IMU angular velocity data from the receiver, transmitter IMU acceleration data from the transmitter, and transmitter IMU angular velocity data from the transmitter; generate a global orientation of the receiver from the receiver IMU acceleration data and the receiver IMU angular velocity data; generate a global orientation of the transmitter from the transmitter IMU acceleration data and the transmitter IMU angular velocity data; generate a set of rotated SigMats by multiplying the raw SigMat by each of four sync correction matrices; generate a set of calibrated, rotated SigMats from the rotated SigMats by applying orthogonalization gain matrices for the receiver sensor magnetic coils and the transmitter source magnetic coils to the rotated SigMats; determining a residual error of each of the calibrated, rotated SigMats; and select the rotated SigMat having a lowest residual error as the correct SigMat to be used for synchronization of the receiver relative to the transmitter.

A further embodiment discloses the system wherein the processor is further configured to: determine the calibrated, rotated SigMat having a next lowest residual error; determine that the residual error of the calibrated, rotated SigMat having the lowest residual error is less than a predefined sync threshold; and determine that the residual error of the calibrated, rotated SigMat having the lowest residual error divided by the residual error of the calibrated, rotated SigMat having the next lowest residual error is greater than a predefined sync value ratio.

Still another embodiment discloses a non-transitory computer-readable storage medium having embodied thereon instructions for causing a computing device to execute a method of automatically synchronizing a transmitter and receiver in a magnetic tracking system to properly determine a position and orientation of the receiver relative to the transmitter, the transmitter comprising a plurality of source magnetic coils each configured to generate a magnetic field and a transmitter inertial measurement unit (IMU), and the receiver comprising a plurality of sensor magnetic coils configured to sense the magnetic fields and to generate a raw signal matrix (SigMat) representing the position and orientation of the receiver relative to the transmitter and a receiver inertial measurement unit (IMU), the method comprising: receiving the raw SigMat from the receiver, receiver IMU acceleration data from the receiver, receiver IMU angular velocity data from the receiver, transmitter IMU acceleration data from the transmitter, and transmitter IMU angular velocity data from the transmitter; generating a global orientation of the receiver from the receiver IMU acceleration data and the receiver IMU angular velocity data; generating a global orientation of the transmitter from the transmitter IMU acceleration data and the transmitter IMU angular velocity data; generating a set of rotated SigMats by multiplying the raw SigMat by each of four sync correction matrices; generating a set of calibrated, rotated SigMats from the rotated SigMats by applying orthogonalization gain matrices for the receiver sensor magnetic coils and the transmitter source magnetic coils to the rotated SigMats; determining a residual error of each of the calibrated, rotated SigMats; and selecting the calibrated, rotated SigMat having a lowest residual error as the correct SigMat to be used for synchronization of the receiver relative to the transmitter.

A further embodiment discloses the non-transitory computer readable storage medium, the method further comprising: determining the calibrated, rotated SigMat having a next lowest residual error; determining that the residual error of the calibrated, rotated SigMat having the lowest residual error is less than a predefined sync threshold; and determining that the residual error of the calibrated, rotated SigMat having the lowest residual error divided by the residual error of the calibrated, rotated SigMat having the next lowest residual error is greater than a predefined sync value ratio.

DETAILED DESCRIPTION OF THE INVENTION

Figure 1:
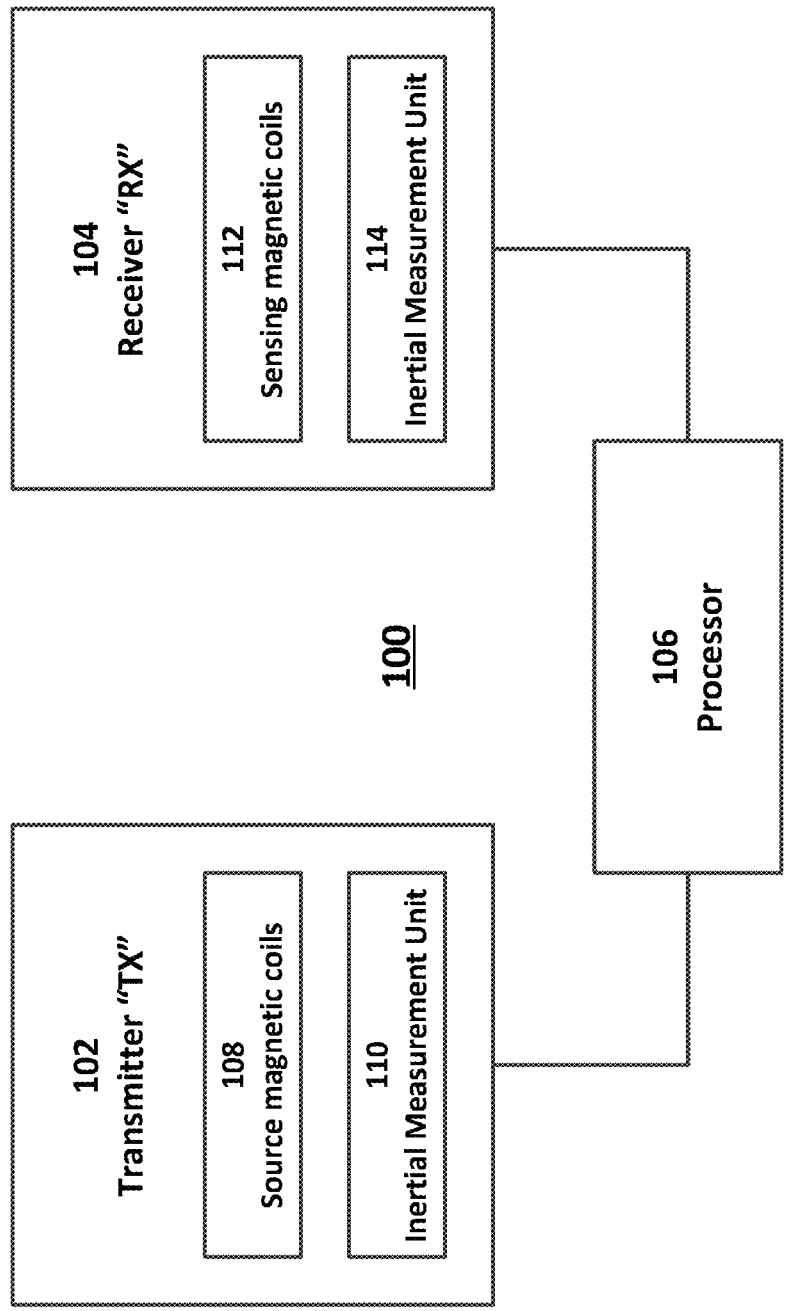
FIG. 1 is a block diagram of one embodiment of a system for automatically synchronizing a magnetic field transmitter and receiver to resolve phase ambiguity.

A method and an apparatus is disclosed for automatically synchronizing a magnetic field transmitter and receiver to resolve phase ambiguity so that phase information for the position and orientation of the receiver may be derived and maintained.

To perform this process automatically, that is, without requiring user intervention, involvement, or action, another source of information about the system is used to infer the correct synchronization ("sync"). In particular, the synchronization process includes the use of inertial measurement unit (IMU) information to determine the phase information.

More particularly, the present approach determines which is the best option among four sync options (i.e., rotations of the signal matrix, as explained further below) automatically without user input. The option chosen is based on information from IMUs on the transmitter and the receiver, which IMUs measure some physical relationships with the world independent of the generated and transmitted electromagnetic field. The sync option which produces a position and orientation estimation that best conforms with the IMU measurements is chosen.

As is known in the art, an IMU is an electronic device that is commonly used to measure and report the velocity, orientation and gravitational forces on a device or craft, using a combination of accelerometers and gyroscopes, and sometimes even magnetometers.

According to one embodiment of the present approach, the accelerometer and gyroscope in the receiver IMU in the receiver is used to define a receiver global orientation (e.g., in the form of a gravity vector or rotation matrix) and the accelerometer and gyroscope in the transmitter IMU is used to define a transmitter global orientation (e.g., in the form of a gravity vector or rotation matrix). The receiver global orientation is then multiplied by the rotation of the receiver in the transmitter frame of reference for each of the four possible solutions of the SigMat signs. The resulting rotated receiver global orientations are then compared with the transmitter gravity vector. Ideally, the rotated receiver global orientations corresponding to the correct sync solution (i.e., having the correct SigMat signs) would be parallel to the transmitter global orientation thus identifying which of the four possible solutions of the SigMat signs is the correct one to use to resolve the phase ambiguity.

Thus, the present approach determines which is the best option among four sync options automatically without user input. The option chosen is based on information from IMUs on the transmitter and the receiver, which IMUs measure some physical relationships with the world independent of the generated and transmitted electromagnetic field. The sync option which produces a position and orientation estimation that best conforms with the IMU measurements is then chosen as the sync solution.

To further explain, not all possibilities of signs of the columns in a SigMat exist. The winding directions, according to the right hand rule in mathematics and physics, on the transmitter and receiver coils ensure that there are only four possibilities. Those possibilities are shown below.

Rotation around the transmitter X axis (changes signs of second and third SigMat columns):

| a11 | -a12 | -a13 |
| a21 | -a22 | -a23 |
| a31 | -a32 | -a33 |

Rotation around the transmitter Y axis (changes signs of first and third SigMat columns):

| -a11 | a12 | -a13 |
| -a21 | a22 | -a23 |
| -a31 | a32 | -a33 |

Rotation around the transmitter Z axis (changes signs of first and second SigMat columns):

| -a11 | -a12 | a13 |
| -a21 | -a22 | a23 |
| -a31 | -a32 | a33 |

No (or "null") rotation around any transmitter axis (not changing signs of SigMat columns):

| a11 | a12 | a13 |
| a21 | a22 | a23 |
| a31 | a32 | a33 |

These rotations around a transmitter axis by changing signs of SigMat columns can be performed by applying a synch correction matrix to the SigMat using a Hadamard matrix product, as explained further elsewhere herein.

The resulting rotated receiver SigMat (or rotated receiver gravity vector) that best conforms to the transmitter global orientation (or transmitter gravity vector) is then chosen as the sync solution, as will now be explained.

Referring now to FIG. 1 is a block diagram of one embodiment of a system for automatically synchronizing a magnetic field transmitter and receiver to resolve phase ambiguity so that phase information for the position and orientation of the receiver may be derived and maintained.

System 100 contains a transmitter "TX" 102, a receiver "RX" 104 and a processor 106. In some embodiments, transmitter 102 is located in a base station, while receiver 104 is attached to some movable object or person. Further, transmitter 102 contains source magnetic coils 108 for generating magnetic fields, while receiver 104 contains sensing magnetic coils 112 for sensing the magnetic fields. In the present embodiment, transmitter 102 and receiver 104 each contain an IMU 110 and 114, respectively.

System 100 also contains processor 106, which generates a SigMat and automatically performs synchronization as described herein from the data it receives from transmitter 102 and receiver 104, and then generates a position and orientation of the receiver. It is to be understood that processor 106 may be located physically separate from both transmitter 102 and receiver 104 or may be physically combined with either one of transmitter 102 or receiver 104.

Figure 2:
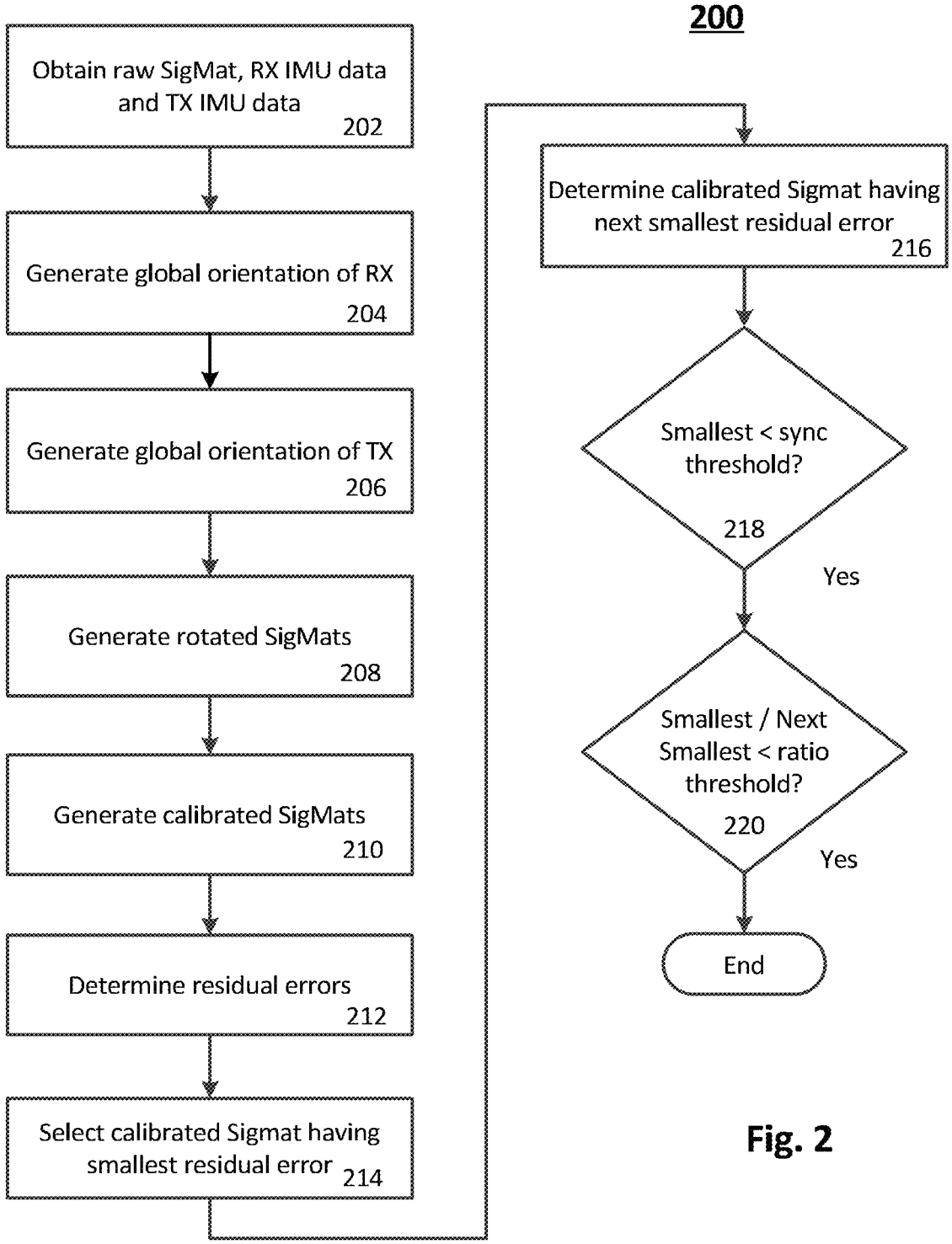
FIG. 2 is a flowchart of one embodiment of a method to automatically synchronize a magnetic field transmitter and receiver to resolve phase ambiguity.

Referring now to FIG. 2, a method according to a process 200 of automatically synchronizing a magnetic field transmitter and receiver to resolve phase ambiguity according to one embodiment will now be explained. As will be explained, in one embodiment, the system of FIG. 1 is used to implement and perform this method.

At step 202, a collection of data, referred to herein as a "sample" or "frame," is obtained. In one embodiment, this collection of data is obtained by processor 106 from receiver 104 and transmitter 102 of FIG. 1. This collection of data includes new sensor data in the form of a raw SigMat from the receiver, receiver IMU acceleration data from the receiver, receiver IMU angular velocity data from the receiver, transmitter IMU acceleration data from the transmitter, and transmitter IMU angular velocity from the transmitter. In some embodiments, as would be understood by one of skill in the art in light of the teachings herein, the collected IMU data may need to be corrected so that it is expressed in the local reference frame of the corresponding coils instead of the local reference frame of the IMU sensor.

As has been explained, the raw SigMat data may have erroneous phase information as indicated by its sign values. In a wireless system lacking a sync signal, it is not known whether the sign values of the receiver generated raw SigMat are accurate or, instead, are rotated around one of the X, Y or Z axis of the transmitter source magnetic coils. It is this ambiguity that the present approach resolves by using IMU data.

In step 204, the global orientation of the receiver is generated from the receiver IMU acceleration data and receiver IMU angular velocity data obtained in step 202. In one embodiment, the receiver's global orientation is generated by processor 106 using an IMU orientation fusion filter such as Mahoney, Madgwick, Kalman, or an Attitude and Heading Reference System (AHRS), each as is known in the art. The receiver's global orientation's pitch and roll should be expressed as relative to gravity but may have its yaw be expressed as relative to an arbitrary heading (as opposed to North or East). Further, the resulting generated receiver global orientation can be expressed as a rotation matrix, a rotation quarternion, a gravity vector, or whatever other form is needed in a given implementation.

In step 206, the global orientation of the transmitter is generated from the transmitter IMU acceleration data and transmitter IMU angular velocity data obtained in step 202. In one embodiment, the transmitter's global orientation is generated by processor 106 using an IMU orientation fusion filter such as Mahoney, Madgwick, Kalman, or an Attitude and Heading Reference System (AHRS), each as is known in the art. The transmitter's global orientation's pitch and roll should be expressed as relative to gravity but may have its yaw be expressed as relative to an arbitrary heading (as opposed to North or East) and need not share the arbitrary reference heading of the receiver's global orientation generated in step 204. Further, the resulting generated transmitter global orientation can be expressed as a rotation matrix, a rotation quarternion, a gravity vector, or whatever other form is needed in a given implementation.

In step 208, a set of four rotated SigMats is generated from the raw SigMat obtained in step 202. In one embodiment, the four rotated SigMats are generated from the raw SigMat by processor 106 computing the Hadamard matrix product X=(raw SigMat) multiplied by each of the four sync correction matrices. As would be understood by one of skill in the art in light of the teachings herein, left multiplication is used because matrix multiplication is not commutative.

In particular, rotation of the raw SigMat around the transmitter X axis is performed by multiplying the raw SigMat by a sync correction matrix "SX" having the form:

| 1 | 0 | 0 |
|---|---|---|
| 0 | -1 | 0 |
| 0 | 0 | -1 |

Further, rotation of the raw SigMat around the transmitter Y axis is performed by multiplying the raw SigMat by a sync correction matrix "SY" having the form:

| -1 | 0 | 0 |
|---|---|---|
| 0 | 1 | 0 |
| 0 | 0 | -1 |

Still further, rotation of the raw SigMat around the transmitter Z axis is performed by multiplying the raw SigMat by a sync correction matrix "SZ" having the form:

| -1 | 0 | 0 |
|---|---|---|
| 0 | -1 | 0 |
| 0 | 0 | 1 |

Yet still further, no (or "null") rotation of the raw SigMat around any transmitter axis is performed by multiplying the raw SigMat by a sync correction matrix "51" having the form:

| 1 | 0 | 0 |
|---|---|---|
| 0 | 1 | 0 |
| 0 | 0 | 1 |

It is to be noted that matrix 51 is an identity matrix and, as is known in the art, the product of any matrix and the identity matrix results in the same matrix. As such, no multiplication need be performed in this step because it has no effect. However, such null rotation multiplication is described here to maintain consistency with the other multiplication rotations described above. As such, despite describing a null rotation multiplication, no such multiplication need actually be performed in this step (again, because it will result in the same matrix) and it will still be considered the equivalent of a null rotation multiplication.

Again, the result of step 208 is the generation of a set of four rotated SigMats with three having been rotated around one of the transmitter X, Y or Z source magnetic coil axis and the fourth having no rotation around any of the transmitter X, Y or Z source magnetic coil axis.

In step 210, the set of four rotated SigMats are calibrated, as would be understood by one of skill in the art in light of the teachings herein, by applying orthogonalization gain matrices Rc and Tc (e.g., the calibrated, rotated SigMat=Rc*rotated SigMat*Tc) to correct for the gain and crosstalk of the receiver and transmitter coils respectively. In one embodiment, this calibration is performed by processor 106 of FIG. 1. Step 210 thus generates a set of four calibrated, rotated SigMats.

As is known in the art, these static matrices Rc and Tc are predetermined for each device and are found via prior calibration. In particular, Tc is a 3×3 fixed-value matrix that normalizes the gain on all 3 axes, corrects for physical mounting rotation of the coil, and corrects for the non-orthogonal skew due to cross-coupling of the transmitter coils. Rc corrects for the same properties of the receiver coils.

In step 212, a residual error is determined for each of the four calibrated, rotated SigMats generated in step 210. In one embodiment, determining a residual error for each one of the four calibrated, rotated SigMats first determines an expected position and orientation of the receiver using the global orientation of the receiver determined in step 204, the global orientation of the transmitter determined in step 206, and the calibrated, rotated SigMat generated in step 210 and is performed by processor 106 of FIG. 1.

The residual error, for each of the four calibrated, rotated SigMats, is determined by calculating a difference between the calibrated, rotated SigMat and an expected SigMat at the expected position and orientation of the receiver. Techniques are known in the art for determining an expected SigMat at the position and orientation the process predicts for the receiver and for calculating a residual error (see, e.g., Equation 7 and corresponding discussion in U.S. patent application Ser. No. 16/368,543 (US 2019/0353745 A1); as would be understood by one of skill in the art, note that Equation 7 may, in a given case, be unable to find any good solution to the position and orientation of the receiver in which case the expected SigMat may be considered a 0 matrix for the purposes of this embodiment).

In step 214, in one embodiment, the calibrated, rotated SigMat having the smallest residual error is selected, by processor 106 of FIG. 1, as the SigMat that best resolves the phase ambiguity and will therefore be the SigMat used for determining the position and orientation of the receiver. In other words, of the four calibrated, rotated SigMats generated in step 210, in this embodiment, the one with the residual error, as determined in step 212, having the smallest magnitude is the one selected as being the correct SigMat to be used for determining the position and orientation of the receiver.

Determining which residual error has the smallest magnitude can be done according to any known formula. In one embodiment, determining magnitude is done according to the function mag(E)=trace (E*E$^T$)/trace (Xcal*Xcal$^T$) where E is the residual error determined in step 212, Xcal is the calibrated, rotated SigMat generated in step 210, trace is the sum of the elements on the main diagonal (from the upper left to the lower right) of the matrix, and the superscript T indicates a matrix transpose (i.e., swapping the rows for the columns in the matrix).

However, simply selecting the calibrated, rotated SigMat having the smallest magnitude residual error as being the correct SigMat to use may not be the best solution. Instead, in a preferred embodiment, the calibrated, rotated SigMat having the smallest magnitude residual error and the calibrated, rotated SigMat having the next smallest magnitude residual error are used to determine whether the calibrated, rotated SigMat having the smallest magnitude residual error is the correct SigMat to be used, as will now be described with reference to steps 216 through 220, each as performed by processor 106 of FIG. 1.

In step 216, the calibrated, rotated SigMat having the next smallest magnitude residual error is determined. This determination can be made in essentially the same way the calibrated, rotated SigMat having the smallest magnitude residual error is determined in step 214.

In step 218, the residual error from the calibrated, rotated SigMat having the smallest magnitude residual error is compared to a predefined sync value threshold to determine if the calibrated, rotated SigMat having the smallest magnitude residual error is a worthy candidate for syncing (i.e., is good enough to be used for determining the receiver position and orientation). In one embodiment, the predefined sync value threshold is 0.2, meaning that no more than 20% of the SigMat having the smallest magnitude residual error can be unaccounted for by the residual error determination made in step 212.

Therefore, in step 218, if the residual error from the calibrated, rotated SigMat having the smallest magnitude residual error does not exceed 0.2, it is deemed a worthy candidate for syncing and the process continues to step 220. Otherwise, the automatic sync process returns to step 202 to obtain new data in order to repeat the process.

In step 220, residual error from the calibrated, rotated SigMat having the smallest error is compared to the residual error from the calibrated, rotated SigMat having the next smallest error. This is done to ensure that the calibrated, rotated SigMat having the smallest error is unambiguously the best candidate. Comparing these two calibrated, rotated SigMats is done by determining if the residual error from the calibrated, rotated SigMat having the smallest error divided by the residual error from the calibrated, rotated SigMat having the next smallest error is less than a predefined sync value ratio. In one embodiment, the predefined sync value ratio is 0.5, which means that the best sync value candidate (i.e., the calibrated, rotated SigMat having the smallest error) must be at least twice as good as the next best sync value candidate (i.e., the calibrated, rotated SigMat having the next smallest error).

Therefore, in step 220, if the residual error from the calibrated, rotated SigMat having the smallest error is at least twice as good as the residual error from the calibrated, rotated SigMat having the next smallest error, then the SigMat having the smallest error is used as the selected SigMat for resolving the phase ambiguity and therefore for determining position and orientation of the receiver. Otherwise, the automatic sync process returns to step 202 to obtain new data in order to repeat the process.

In an alternative embodiment, determining residual errors in step 212 is performed using IMU acceleration and/or angular velocity directly, for example using a Kalman filter implementation, in which case steps 204 and 206 of process 200 would not be needed and, instead, IMU vectors (i.e., from the IMU data obtained in step 202) would be used in step 212.

A method and apparatus has thus been disclosed for automatically synchronizing a magnetic field transmitter and receiver to resolve phase ambiguity so that phase information for the position and orientation of the receiver may be derived and maintained. Further, as described and shown, this process is performed automatically, that is, without requiring user intervention, involvement, or action, thus making it particularly useful with remotely-directed, non-expert users (e.g., patients undergoing telehealth-based physical or occupational therapy).

Additional embodiments to those mentioned above are described below. In some embodiments, a method for automatically determining relative orientation between a transmitter and a receiver in a system is described. The method includes measuring inertial measurement unit (IMU) data at the transmitter and at the receiver. A signal transmitted from the transmitter is received at the receiver. The system generates a signal matrix based on the received signal and determines a plurality of modified signal matrices based on multiplying each of a plurality of correction matrices and the signal matrix. A target signal matrix based on a set of orientation coordinates optimized by the IMU data is then generated. The system determines a plurality of residual signal matrices are by calculating a difference between each of the plurality of modified signal matrices and the target signal matrix. A plurality of magnitudes corresponding to each of the plurality of residual signal matrices are also calculated. The calculations of magnitudes are used to identify a modified signal matrix, from the plurality of modified signal matrices. In one embodiment, the identified modified signal matrix is a signal matrix with the least magnitude from the plurality of calculated magnitudes.

The sequence of steps described in the above-mentioned embodiment are interchangeable and any combination and reordering of the sequence of steps are contemplated within the embodiments. The steps may also be performed either sequentially or in parallel.

In some embodiments, the system generates the corrected position and orientation information of the receiver relative to the transmitter from the identified modified signal matrix.

In some embodiments, the method for automatically determining relative orientation between a transmitter and a receiver described above includes receiving, at the receiver, a second signal transmitted from the transmitter. A second signal matrix based on the received second signal is generated at the receiver. A corrected signal matrix is calculated by multiplying the second signal matrix and the stored correction matrix.

In some embodiments, the corrected signal matrix with the least magnitude may be stored in a non-transitory computer readable storage medium such as a hard disk drive, floppy disk, optical disc such as a compact disc (CD) or digital versatile disc (DVD), or flash memory.

In some embodiments, the plurality of correction matrices described above are associated with rotations over each of a transmitter x-axis, y-axis, and z-axis, and an identity matrix.

In some embodiments, the receiver is attached to a movable person or an object. For example, the receiver, or the transmitter, may be part of a virtual reality, augmented reality, or mixed reality system and be associated with a sensor that is attached to a person's body part.

The disclosed system and method has been explained above with reference to several embodiments. Other embodiments will be apparent to those skilled in the art in light of this disclosure. Certain aspects of the described method and apparatus may readily be implemented using configurations or steps other than those described in the embodiments above, or in conjunction with elements other than or in addition to those described above. It will also be apparent that in some instances the order of steps described herein may be altered without changing the result of performance of all of the described steps.

There may be a single processor, or multiple processors performing different functions of the functions described herein. One of skill in the art will appreciate how to determine which and how many processors will be appropriate for a specific intended application, and where in a given system they might be located.

It should also be appreciated that the described method and apparatus can be implemented in numerous ways, including as a process, an apparatus, or a system. The methods described herein may be implemented by program instructions for instructing a processor to perform such methods, and such instructions recorded on a non-transitory computer readable storage medium such as a hard disk drive, floppy disk, optical disc such as a compact disc (CD) or digital versatile disc (DVD), flash memory, etc. It may be possible to incorporate the described methods into hard-wired logic if desired. It should be noted that the order of the steps of the methods described herein may be altered and still be within the scope of the disclosure.

These and other variations upon the embodiments are intended to be covered by the present disclosure, which is limited only by the appended claims.

What is claimed is:

1. A method of automatically synchronizing a transmitter and a receiver in a magnetic tracking system to properly determine a position and orientation of the receiver relative to the transmitter, the transmitter comprising a plurality of source magnetic coils each configured to generate a magnetic field and a transmitter inertial measurement unit (IMU), and the receiver comprising a plurality of sensor magnetic coils configured to sense the magnetic fields and to generate a raw signal matrix (SigMat) representing the position and orientation of the receiver relative to the transmitter and a receiver inertial measurement unit (IMU), the method comprising:

receiving, at a processor, the raw SigMat from the receiver, receiver IMU acceleration data from the receiver, receiver IMU angular velocity data from the receiver, transmitter IMU acceleration data from the transmitter, and transmitter IMU angular velocity data from the transmitter;

generating, by the processor, a global orientation of the receiver from the receiver IMU acceleration data and the receiver IMU angular velocity data;

generating, by the processor, a global orientation of the transmitter from the transmitter IMU acceleration data and the transmitter IMU angular velocity data;

generating, by the processor, a set of rotated SigMats by multiplying the raw SigMat by each of four sync correction matrices;

generating, by the processor, a set of calibrated, rotated SigMats from the rotated SigMats by applying orthogonalization gain matrices for the receiver sensor magnetic coils and the transmitter source magnetic coils to the rotated SigMats;

determining, by the processor, a residual error of each of the calibrated, rotated SigMats;

selecting, by the processor, the calibrated, rotated SigMat having a lowest residual error; and causing the receiver to be synchronized with respect to at least position relative to the transmitter based at least in part on the selected calibrated, rotated SigMat having the lowest residual error.

2. The method of claim 1, further comprising:

determining, by the processor, the calibrated, rotated SigMat having a next lowest residual error;

determining, by the processor, that the residual error of the calibrated, rotated SigMat having the lowest residual error is less than a predefined sync threshold; and determining, by the processor, that the residual error of the calibrated, rotated SigMat having the lowest residual error divided by the residual error of the calibrated, rotated SigMat having the next lowest residual error is greater than a predefined sync value ratio.

3. The method of claim 2, wherein the predefined sync threshold is 0.2.

4. The method of claim 2, wherein the predefined sync value ratio is 0.5.

5. An automatically synchronizing magnetic tracking system for properly determining a position and orientation of a receiver relative to a transmitter, comprising:

a transmitter comprising a plurality of source magnetic coils each configured to generate a magnetic field and a transmitter inertial measurement unit (IMU);

receiver comprising a plurality of sensor magnetic coils configured to sense the magnetic fields and to generate a raw signal matrix (SigMat) representing the position and orientation of the receiver relative to the transmitter and a receiver inertial measurement unit (IMU); and a processor configured to:

receive the raw SigMat from the receiver, receiver IMU acceleration data from the receiver, receiver IMU angular velocity data from the receiver, transmitter IMU acceleration data from the transmitter, and transmitter IMU angular velocity data from the transmitter;

generate a global orientation of the receiver from the receiver IMU acceleration data and the receiver IMU angular velocity data;

generate a global orientation of the transmitter from the transmitter IMU acceleration data and the transmitter IMU angular velocity data;

generate a set of rotated SigMats by multiplying the raw SigMat by each of four sync correction matrices;

generate a set of calibrated, rotated SigMats from the rotated SigMats by applying orthogonalization gain matrices for the receiver sensor magnetic coils and the transmitter source magnetic coils to the rotated SigMats;

determine a residual error of each of the calibrated, rotated SigMats;

select the rotated SigMat having a lowest residual error; and cause the receiver to be synchronized with respect to at least position relative to the transmitter based at least in part on the selected, rotate SigMat having the lower residual error.

6. The system of claim 5 wherein the processor is further configured to:

determine the calibrated, rotated SigMat having a next lowest residual error;

determine that the residual error of the calibrated, rotated SigMat having the lowest residual error is less than a predefined sync threshold; and determine that the residual error of the calibrated, rotated SigMat having the lowest residual error divided by the residual error of the calibrated, rotated SigMat having the next lowest residual error is greater than a predefined sync value ratio.

7. The system of claim 6, wherein the predefined sync threshold is 0.2.

8. The system of claim 6, wherein the predefined sync value ratio is 0.5.

9. A non-transitory computer readable storage medium having embodied thereon instructions for causing a computing device to execute a method of automatically synchronizing a transmitter and a receiver in a magnetic tracking system to properly determine a position and orientation of the receiver relative to the transmitter, the transmitter comprising a plurality of source magnetic coils each configured to generate a magnetic field and a transmitter inertial measurement unit (IMU), and the receiver comprising a plurality of sensor magnetic coils configured to sense the magnetic fields and to generate a raw signal matrix (SigMat) representing the position and orientation of the receiver relative to the transmitter and a receiver inertial measurement unit (IMU), the method comprising:

receiving the raw SigMat from the receiver, receiver IMU acceleration data from the receiver, receiver IMU angular velocity data from the receiver, transmitter IMU acceleration data from the transmitter, and transmitter IMU angular velocity data from the transmitter;

generating a global orientation of the receiver from the receiver IMU acceleration data and the receiver IMU angular velocity data;

generating a global orientation of the transmitter from the transmitter IMU acceleration data and the transmitter IMU angular velocity data;

generating a set of rotated SigMats by multiplying the raw SigMat by each of four sync correction matrices;

generating a set of calibrated, rotated SigMats from the rotated SigMats by applying orthogonalization gain matrices for the receiver sensor magnetic coils and the transmitter source magnetic coils to the rotated SigMats;

determining a residual error of each of the calibrated, rotated SigMats;

selecting the calibrated, rotated SigMat having a lowest residual error; and causing the receiver to be synchronized with respect to at least position relative to the transmitter based at least in part on the selected calibrated, rotated SigMat having the lowest residual error.

10. The non-transitory computer readable storage medium of claim 9, the method further comprising:

determining the calibrated, rotated SigMat having a next lowest residual error;

determining that the residual error of the calibrated, rotated SigMat having the lowest residual error is less than a predefined sync threshold; and determining that the residual error of the calibrated, rotated SigMat having the lowest residual error divided by the residual error of the calibrated, rotated SigMat having the next lowest residual error is greater than a predefined sync value ratio.

11. The non-transitory computer readable storage medium of claim 10, wherein the predefined sync threshold is 0.2.

12. The non-transitory computer readable storage medium of claim 10, wherein the predefined sync value ratio is 0.5.

* * * * *